(12) United States Patent
Lu et al.

(10) Patent No.: US 12,621,634 B2
(45) Date of Patent: May 5, 2026

(54) UPDATE SERVICE OPERATION FOR SHORT MESSAGE SERVICE (SMS) SERVICE

(71) Applicant: Telefonaktiebolaget LM Ericsson (publ), Stockholm (SE)

(72) Inventors: Yunjie Lu, Shanghai (CN); George Foti, Dollard des Ormeaux (CA); Shabnam Sultana, Montreal (CA); Qian Chen, Mölndal (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 667 days.

(21) Appl. No.: 18/003,434

(22) PCT Filed: Jun. 28, 2021

(86) PCT No.: PCT/IB2021/055773
§ 371 (c)(1),
(2) Date: Dec. 27, 2022

(87) PCT Pub. No.: WO2022/003542
PCT Pub. Date: Jan. 6, 2022

(65) Prior Publication Data
US 2023/0247394 A1 Aug. 3, 2023

Related U.S. Application Data

(60) Provisional application No. 63/045,471, filed on Jun. 29, 2020.

(51) Int. Cl.
*H04W 4/14* (2009.01)
*H04W 8/18* (2009.01)
*H04W 60/00* (2009.01)

(52) U.S. Cl.
CPC .............. *H04W 4/14* (2013.01); *H04W 8/18* (2013.01); *H04W 60/00* (2013.01)

(58) Field of Classification Search
CPC ......... H04W 4/14; H04W 8/18; H04W 60/00; H04W 8/08; H04W 88/06
See application file for complete search history.

(56) References Cited

U.S. PATENT DOCUMENTS

2023/0098825 A1* 3/2023 Tang ...................... H04W 8/02

FOREIGN PATENT DOCUMENTS

| EP | 3783937 A1 | 2/2021 |
| WO | 2019/201038 A1 | 10/2019 |

OTHER PUBLICATIONS

Japanese Office Action and machine English translation of the Japanese Office Action dated Dec. 5, 2023 issued in corresponding Japanese Patent Application No. 2022-580742, consisting of 6 pages.

(Continued)

*Primary Examiner* — Marisol Figueroa
(74) *Attorney, Agent, or Firm* — Weisberg I.P. Law, P.A.

(57) ABSTRACT

Apparatuses and methods tor an update service operation tor short message service, SMS, service are disclosed. In one embodiment, a method implemented in access and mobility management function, AMF, node (S104) includes performing an update service operation with a short message service function, SMSF, node to add or remove a first user equipment, UE, context information associated to a first access type, the update service operation indicating to the SMSF node the first access type to add or remove. In some embodiment, a method implemented in a short message service function, SMSF, node (S106) includes performing an update service operation with an access and mobility management, AMF, node to add or remove a first user equipment, UE, context information associated to a first access type, the update service operation indicating to the SMSF node the first access type to add or remove.

12 Claims, 8 Drawing Sheets

(56)          References Cited

OTHER PUBLICATIONS

3GPP TSG-WG SA2 Meeting #138E e-meeting; S2-2003091 (revision of S2-200xxxx); Change Request 23.502 CR 2279 rev—Current version: 16.4.0; Title: Correction on Deregistration Procedures for SMS Over NAS; Source to WG: Huawei, HiSilicon; Source to TSG: SA2; Work Item Code: 5GS_Ph1; Elbonia, Apr. 20-23, 2020, consisting of 6 pages.

3GPP TSG-WG SA2 Meeting #138E; S2-2002812 (revision of S2-200xxxx); Change Request 23.502 CR 2201 rev—Current version 16.4.0; Title: Clarification on Slice for SMS; Source to WG: LG Electronics; Source to TSG: SA2; Work Item Code: eNS; Elbonia, Apr. 20-24, 2020, consisting of 21 pages.

International Search Report and Written Opinion dated Oct. 5, 2021 issued in PCT Application No. PCT/IB2021/055773, consisting of 19 pages.

International Preliminary Report on Patentability dated Jun. 21, 2022 issued in PCT/IB2021/055773, consisting of 18 pages.

3GPP TS 23.501 V16.4.0 (Mar. 2020) 3rd Generation Partnership Project; Technical Specification Group Services and System Aspects; System Architecture for the 5G System (5GS); Stage 2 (Release 16), consisting of 430 pages.

3GPP TS 23.502 V16.4.0 (Mar. 2020) 3rd Generation Partnership Project; Technical Specification Group Services and System Aspects; Procedures for the 5G System (5GS); Stage 2 (Release 16), consisting of 582 pages.

3GPP TS 29.540 V16.3.0 (Mar. 2020) 3rd Generation Partnership Project; Technical Specification Group Core Network and Terminals; 5G System; SMS Services; Stage 3 (Release 16), consisting of 29 pages.

3GPP TSG-WG SA2 Meeting #138 e-meeting; S2-2003288 (revision of S2-2003090r04); Title: Correction on Deregistration Procedures for SMS over NAS; Source to WG: Huawei, HiSilicon; Source to TSG: SA2; Work Item Code: 5GS_Ph1; Elbonia, Apr. 20-24, 2020, consisting of 4 pages.

3GPP TSG-CT4 Meeting #101e; C4-205517 (revision of C4-205126); Title: Correction to Support Multiple Access Type for SMS; Source to WG: Nokia, Nokia Shanghai Bell, ZTE; Source to TSG: CT4; Work Item Code: 5GS_Ph1-CT; EMeeting Nov. 3-13, 2020, consisting of 10 pages.

3GPP TSG-CT WG4 Meeting #101e; C4-205190; Title: Access Type in SMS Activation / De-activation; Source to WG:ZTE; Source to TSG: CT4; Work Item Code: 5GS_Ph1-CT, TEI16; E-Meeting, Nov. 3-13, 2020, consisting of 6 pages.

* cited by examiner

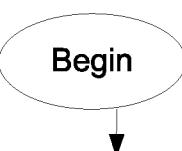

Perform an update service operation with a short message service function, SMSF, node to add or remove a first user equipment, UE, context information associated to a first access type, the update service operation indicating to the SMSF node the first access type to add or remove.
S104

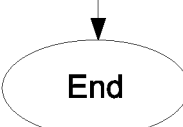

FIG. 8

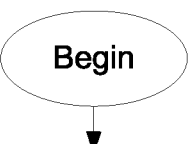

Perform an update service operation with an access and mobility management, AMF, node to add or remove a first user equipment, UE, context information associated to a first access type, the update service operation indicating to the SMSF node the first access type to add or remove.
S106

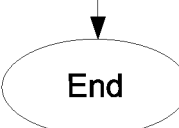

FIG. 9

UPDATE SERVICE OPERATION FOR SHORT MESSAGE SERVICE (SMS) SERVICE

CROSS-REFERENCE TO RELATED APPLICATIONS

This application is a Submission Under 35 U.S.C. § 371 for U.S. National Stage Patent Application of International Application No.: PCT/IB2021/055773, filed Jun. 28, 2021 entitled "UPDATE SERVICE OPERATION FOR SHORT MESSAGE SERVICE (SMS) SERVICE," which claims priority to U.S. Provisional Application No. 63/045,471, filed Jun. 29, 2020, entitled "SERVICE OPERATION FOR SHORT MESSAGE SERVICE (SMS) SERVICE," the entireties of both of which are incorporated herein by reference.

TECHNICAL FIELD

The present disclosure relates to wireless communication and in particular, methods and apparatuses for an update service operation for short message service (SMS) service.

BACKGROUND

The short message service (SMS) service is supported in the $3^{rd}$ Generation Partnership Project (3GPP) $5^{th}$ Generation System (5GS) and documented in, for example, 3GPP Technical Specification (TS) 23.501/23.502.

The FIG. 1 flow diagram shows an example of UE registration for SMS in an example system 10 that includes a user equipment (UE) 12, a unified data management (UDM) 14, an access and mobility management function (AMF) 16 and a short message service function (SMSF) 18. In step 1, when a UE 12 registers to an AMF 16, the AMF 16 can register to a SMSF 18 for short message service (SMS) over a non-access stratum (NAS) service authorization, as shown in steps 2-5. Then, the SMSF 18 may in turn register to a UDM 14, as shown in FIGS. 6-8. In step 9, the AMF 16 sends a registration accept message to the UE 12. References to figures in FIG. 1, refer to the figures in 3GPP TS 23.502

SUMMARY

Some embodiments advantageously provide methods and apparatuses for an update service operation for SMS service.

In one embodiment, a method implemented in access and mobility management function (AMF) node includes sending an update service operation message to a short message service function (SMSF) node to update, for a first access type, user equipment (UE) context information for a short message service (SMS) service.

In some embodiment, a method implemented in a short message service function (SMSF) node includes receiving an update service operation message, the update service response message requesting to update, for a first access type, user equipment (UE) context information for a short message service (SMS) service.

According to an aspect of some embodiments of the present disclosure, a method implemented in an access and mobility management, AMF, node is provided. The method includes performing an update service operation with a short message service function, SMSF, node to add or remove a first user equipment, UE, context information associated to a first access type, the update service operation indicating to the SMSF node the first access type to add or remove.

In some embodiments of this aspect, the performing the update service operation comprises sending a short message service, SMS, service message to the SMSF node, the SMS service message comprising an indication of the first access type to add or remove. In some embodiments of this aspect, sending the SMS service message comprises sending a short message service, SMS, service activate message to add the first UE context information associated to the first access type; sending a short message service, SMS, service de-activate message to remove first the UE context information associated to the first access type; and sending a short message service, SMS, service update message to add or remove first the UE context information associated to the first access type.

In some embodiments of this aspect, performing the update service operation to remove the first UE context information associated to the first access type comprises while a user equipment, UE, is registered at the AMF node for a short message service, SMS, service over the first access type and over a second access type, sending a SMS service message indicating the first access type to request the SMSF node to remove the first UE context information associated to the first access type and the UE, while maintaining at the SMSF node a second UE context information associated to the second access type and the UE.

In some embodiments of this aspect, performing the update service operation to remove the first UE context information associated to the first access type is as a result of at least one of: the UE indicating to the AMF node to discontinue use of the SMS service over the first access type; the UE being deregistered on the first access type; and receiving a deregistration notification associated with the UE from a unified data management, UDM, node for the first access type. In some embodiments of this aspect, performing the update service operation to add the first UE context information associated to the first access type comprises: while a user equipment, UE, is registered at the AMF node for a short message service, SMS, service over a second access type, sending a SMS service message indicating the first access type to request the SMSF node to add the first UE context information associated to the first access type and the UE, while maintaining at the SMSF node a second UE context information associated to the second access type and the UE.

In some embodiments of this aspect, the update service operation indicates to the SMSF node further information to add or remove from the first UE context information associated to the first access type. In some embodiments of this aspect, the further information comprises at least one of a Time Zone, a routing indicator and a unified data management, UDM, group identifier for the UE that is to be added or removed in the first UE context information associated to the first access type.

According to an aspect of the present disclosure, a method implemented in a short message service function, SMSF, node, is provided. The method comprises performing an update service operation with an access and mobility management, AMF, node to add or remove a first user equipment, UE, context information associated to a first access type, the update service operation indicating to the SMSF node the first access type to add or remove.

In some embodiments of this aspect, the performing the update service operation comprises receiving a short message service, SMS, service message from the AMF node, the SMS service message comprising an indication of the first access type to add or remove. In some embodiments of this aspect, receiving the SMS service message comprises receiving a short message service, SMS, service activate message requesting the SMFS node to add the first UE context information associated to the first access type; receiving a short message service, SMS, service de-activate message requesting the SMFS node to remove first the UE context information associated to the first access type; and receiving a short message service, SMS, service update message requesting the SMFS node to add or remove the first the UE context information associated to the first access type.

In some embodiments of this aspect, performing the update service operation to remove the first UE context information associated to the first access type comprises as a result of receipt of a short message service, SMS, service message indicating the first access type, releasing the first UE context information associated to the first access type and the UE, while maintaining at the SMSF node a second UE context information associated to the second access type and the UE. In some embodiments of this aspect, performing the update service operation to remove the first UE context information associated to the first access type is as a result of at least one of: the UE indicating to the AMF node to discontinue use of the SMS service over the first access type; the UE being deregistered on the first access type; and a deregistration notification associated with the UE from a unified data management, UDM, node for the first access type.

In some embodiments of this aspect, performing the update service operation to add the first UE context information associated to the first access type comprises as a result of receipt of a short message service, SMS, service message indicating the first access type, adding the first UE context information associated to the first access type and the UE, while maintaining at the SMSF node a second UE context information associated to the second access type and the UE. In some embodiments of this aspect, the update service operation requests the SMSF node to add or remove further information from the first UE context information associated to the first access type. In some embodiments of this aspect, the further information comprises at least one of a Time Zone, a routing indicator and a unified data management, UDM, group identifier for the UE that is to be added or removed in the first UE context information associated to the first access type.

According to yet another aspect of the present disclosure, an access and mobility management, AMF, node comprising processing circuitry is provided. The processing circuitry is configured to cause the AMF node to perform any one or more of the methods above.

According to another aspect of the present disclosure, a short message service function, SMSF, node comprising processing circuitry is provided. The processing circuitry configured to cause the SMSF node to perform any one or more of the methods above is provided.

According to another aspect of the present disclosure, a computer-readable medium comprising computer instructions executable by a processor to perform any one or more of the methods above is provided.

According to another aspect of the present disclosure, a system is provided. The system comprising an access and mobility management, AMF, node configured to operate according to any one of more of the AMF methods above; and a short message service function, SMSF, node configured to operate according to any one of more of the SMSF methods above.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 8 is a flowchart of another exemplary process in a network node (e.g., AMF node) according to some embodiments of the present disclosure;

FIG. 9 is a flowchart of yet another exemplary process in a network node (e.g., SMSF node) according to some embodiments of the present disclosure.

DETAILED DESCRIPTION

As an initial matter, it is noted that references to 3GPP TS 23.501 and 3GPP TS 23.502 herein refer to version 16.4.0 of these TSs. The current context management for SMS service between the AMF 16 and the SMSF 18 is per UE level, while the context management for SMS service between SMSF 18 and UDM 14 is per UE per access type (3GPP access, non-3GPP access).

Thus, it may be useful for the AMF 16 to report the SMS over NAS capability over 3GPP access and non-3GPP access to the SMSF (e.g., the adding or removal of one access type). Otherwise, the SMSF 18 may not be able to perform proper per access type based registration towards the UDM 14.

Some embodiments have considered to introduce the per access type based information reporting (removal or adding of the access type) from AMF 16 to SMSF 18. It has been considered to use the current "Deactivate" service operation which is currently specified at the UE level context management (i.e., using the Deactivate service operation means that the UE is totally removed in the SMSF service for the entire UE).

Figure 1:
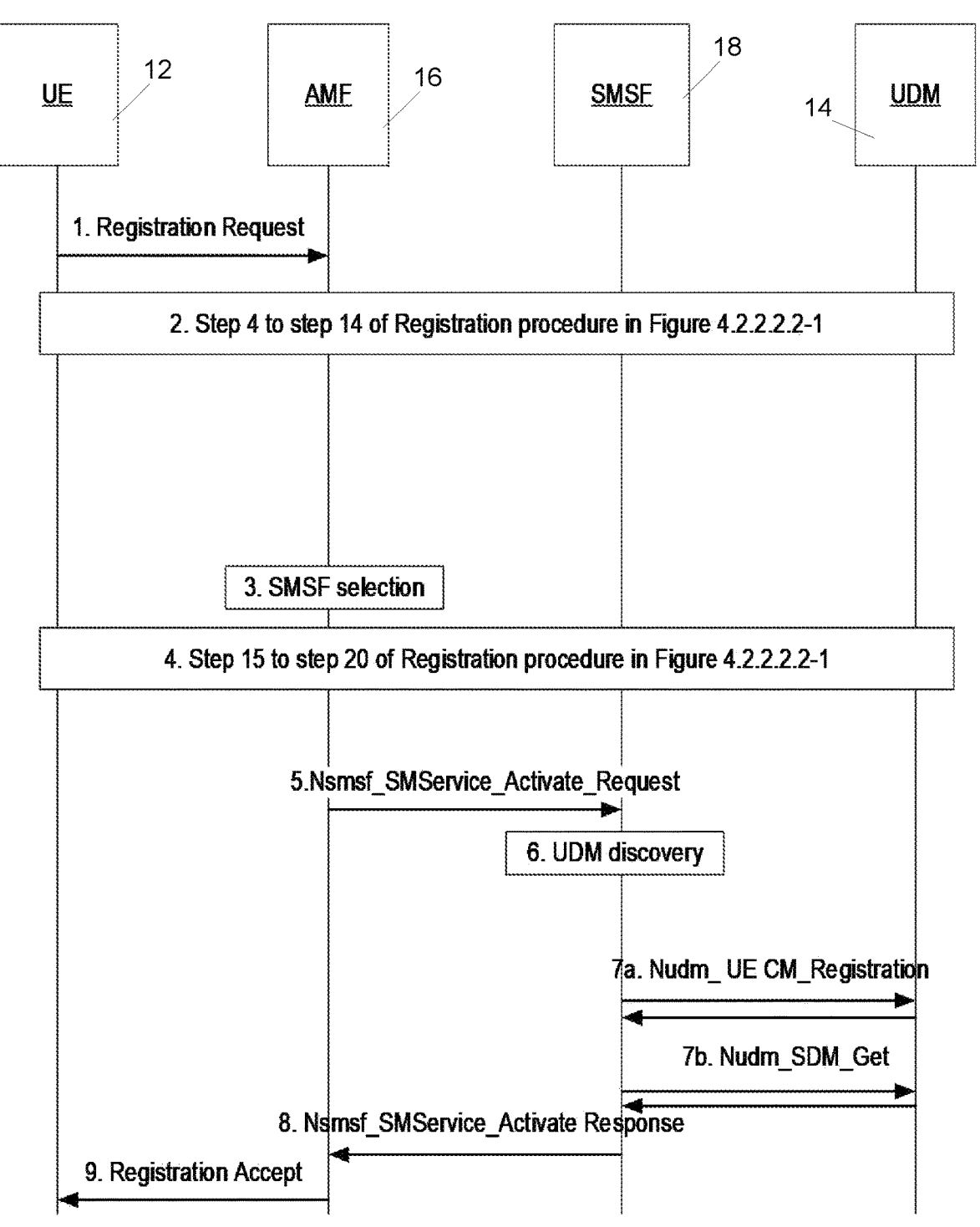
FIG. 1 illustrates an example registration procedure for SMS over NAS.
Figure 2:
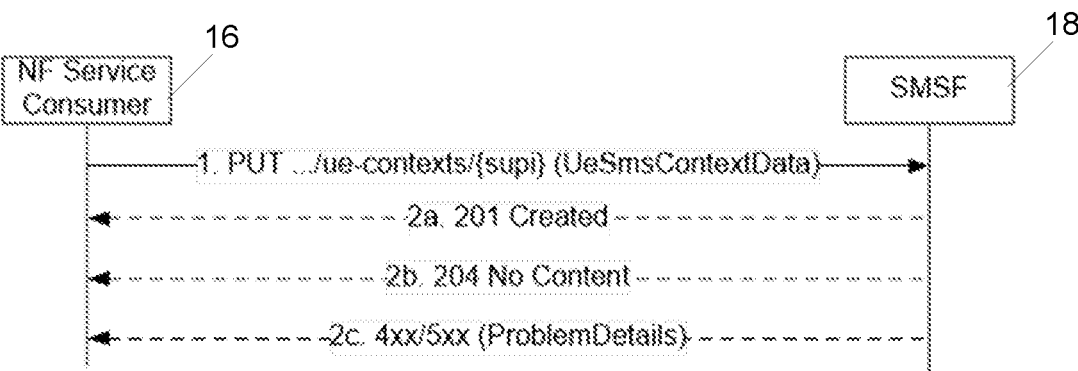
FIG. 2 illustrates an example activate service operation.

As shown in the information below from 3GPP TS 23.502 and 3GPP TS 29.540 and FIGS. 2 and 3, the existing deactivate and activate service operations are performed at the UE level. Thus, currently, when the NF-service consumer (e.g., AMF 16) sends a new Activate service operation, the previous UE context is overridden totally in the SMSF 18. When the NF-service consumer (e.g., AMF 16) sends a Deactivate service operation message, currently, the entire UE context is deleted.

From 3GPP TS 23.502:

Nsmsf_SMService_Deactivate service operation

Service operation name: Nsmsf_SMService_Deactivate.

Description: Remove SMS service authorization from SMSF for a given service user.

Concurrent use: None.

Inputs, Required: SUPI.

Inputs, Optional: None.

Outputs, Required: SMS service deactivation result.

Outputs, Optional: None.

From 3GPP TS 29.540, Section 5.2.2.2:

Activate

The Activate service operation is to be used by the NF Service Consumer (e.g. AMF) to activate SMS service for a given service user, which results in creating or updating an individual UE Context for SMS in the SMSF, in the following procedures:

Registration Procedure for SMS over NAS (see clause 4.13.3.1 of 3GPP TS 23.502);

Registration Update Procedure for SMS over NAS due to AMF change (see clause 4.13.3.1 of 3GPP TS 23.502);

There is to be only one individual UE Context for SMS per service user. See for example, FIG. 2.

Deactivate

The Deactivate service operation is to be used by the NF Service Consumer (e.g. AMF 16) to deactivate SMS service for a given service user, which results in deleting an individual UE Context for SMS in the SMSF, in the following procedures:

De-Registration Procedure for SMS over NAS (see clause 4.13.3.2 of 3GPP TS 23.502);

De-Registration procedure using Deactivate service operation.

Figure 3:
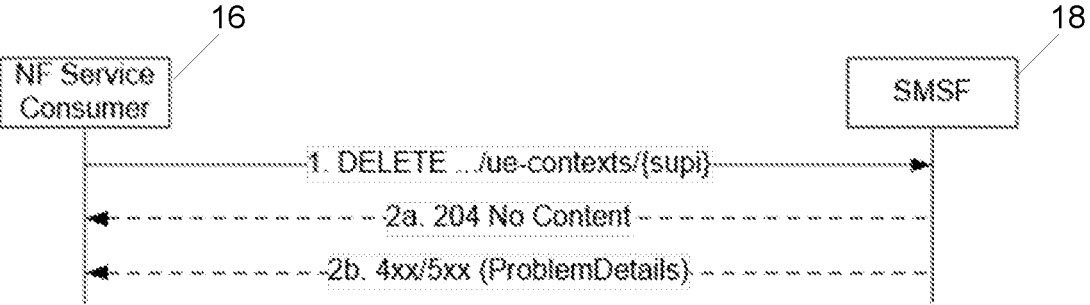
FIG. 3 illustrates an example deactivate service operation.

The NF Service Consumer (e.g. AMF 16) is to deactivate SMS service for a given service user by using the HTTP DELETE method as shown in FIG. 3.

Thus, currently, using the Deactivation service operation means the entire UE context is removed totally. Some embodiments consider changing the Activation/Deactivation service operation to per access type Activate/Deactivate between AMF/SMF. Although, it may have an impact for UE registration and create issues between 3GPP Release 15 (rel-15) and 3GPP Release 16 (rel-16), which is undesirable, it may still be useful.

Some embodiments of the present disclosure define a new service operation for SMS service. In some embodiments, such service operation may be used by the AMF 16 to send new UE related information to the SMSF 18 when the UE is already registered/activated in the SMSF 18.

Some embodiments of the present disclosure propose a service operation that "updates" the existing UE context with access type information. Some embodiments propose to update the Deactivate/Activate service operation to be able to provide per access type updates (e.g., delete/add UE context for a specific access type, rather than all UE contexts). Some embodiments propose a separate service operation to update UE context per access type and that the Deactivate service operation is only to be used when the UE context needs to be removed totally (in other words, no SMS at all at both 3GPP and N3GPP).

Some embodiments of the present disclosure may advantageously provide a solution to update UE related information from the AMF to the SMSF.

Before describing in detail exemplary embodiments, it is noted that the embodiments reside primarily in combinations of apparatus components and processing steps related to an update service operation for short message service (SMS) service. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the non-limiting terms wireless device (WD) or a user equipment (UE) are used interchangeably. The UE herein can be any type of wireless device capable of communicating with a network node or another UE over radio signals. In some embodiments, the UE may be an autonomous machine configured to communicate via IMS. The UE herein can by any type of communication device capable of communicating with another UE, an application server, a network node, a server, an IMS NF or other IMS network node, via a wired connection and/or a wireless connection. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "node" is used herein and can be any kind of network node, such as, a base station or a core network node, such as a 5G and/or NR network node, an AMF node, a SMSF node, a UDM node, etc.

A node may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node is said to be virtualized. A node may be associated with multiple physical components that may be located either in one location, or may be distributed across multiple locations.

In some embodiments, the more general term "access type" is used and may indicate a radio access technology (RAT) type. Thus, the terms "access type" and "RAT type"

may be interchangeable in this disclosure. The RAT may be considered the underlying physical connection method for a radio based communication network. Although two different access types are discussed, 3GPP access type and N3GPP access type, the proposed service update operation may be used to add and/or remove yet other access types.

In some embodiments, the term "update/updating" is used and may include adding and/or removing the information indicated in the proposed update service operation, per UE and per access type and/or not merely per UE level.

In some embodiments, the phrase "for the first access type" is used and may mean for the first access type only, and not any other access type that is not indicated in the proposed update service operation.

It should be understood that the service operation discussed in the present disclosure may have any name and should not be limited to the specific names used herein, which are exemplary and/or descriptive, such as, "update service operation", or existing service operations such as activate and deactivate, since services and/or messages may, for example, be given another name in a specification, even though the use/function is as disclosed in the present disclosure.

Any two or more embodiments described in this disclosure may be combined in any way with each other.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

Note that although terminology from one particular wireless system, such as, for example, $3^{rd}$ Generation Partnership Project (3GPP), Long Term Evolution (LTE), $5^{th}$ Generation (5G) (also known as New Radio (NR)), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by an AMF node 16 or an SMSF node 18 or any network node may be distributed over a plurality of AMF nodes 16 or a plurality of SMSF nodes 18 or a plurality of network nodes. In other words, it is contemplated that the functions of the UE 12, AMF node 16, SMSF node 18 or network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 4:
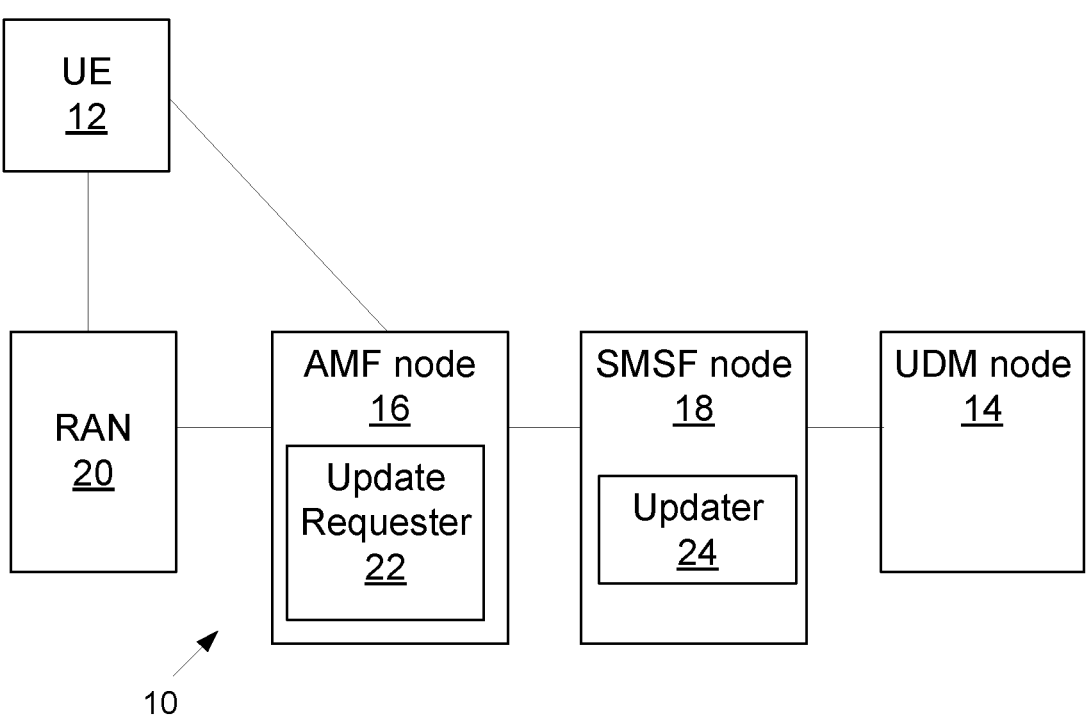
FIG. 4 illustrates an example system architecture according to some embodiments of the present disclosure.

Referring again to the drawing figures, in which like elements are referred to by like reference numerals, there is shown in FIG. 4 a schematic diagram of an example communication system 10 constructed in accordance with the principles of the present disclosure. The communication system 10 in FIG. 4 is a non-limiting example and other embodiments of the present disclosure may be implemented by one or more other systems and/or networks. Referring to FIG. 4, the system 10 includes a UE 12, in addition to various support elements for supporting short message service (SMS) delivery to the UE 12 such as a radio access network (RAN) 20 (e.g., 3GPP $5^{th}$ Generation (5G) RAN also known as New Radio or NR RAN), which may provide radio access to the UE 12. The system 10 includes an Access and Mobility Management Function (AMF) node 16, which may provide a function for access and/or mobility management for the UE 12. The system 10 includes the SMSF node 18. In some embodiments, the SMSF node 18 may support the transfer of SMS to the UE 12 e.g., over non-Access stratum (NAS). In this capacity, the SMSF may conduct subscription checking and perform a relay function between the device and the SMSC (Short Message Service Centre), through interaction with the AMF node 16. The system 10 includes a UDM node 14, which stores and manages subscriber information. It should be noted that, for simplicity, a single node is shown for the various entities in the system 10 depicted in FIG. 4 (e.g., a single UE 12, a single RAN 20, a single AMF node 16, a single SMSF node 18, a single UDM node 14, etc.); however, it should be understood that the system 10 may include numerous entities/nodes of those shown in FIG. 4, as well as, additional entities/nodes not shown in FIG. 4. In addition, the system 10 may include many more connections than those shown in FIG. 4.

The AMF node 16 may include an update requester 22, which may be configured to send an update service operation message to a short message service function (SMSF) node to update, for a first access type, user equipment (UE) context information for a short message service (SMS) service.

The SMSF node 18 may include an updater 24, which may be configured to receive an update service operation message, the update service response message requesting to update, for a first access type, user equipment (UE) context information for a short message service (SMS) service and/or update (e.g., add/remove) UE context information per the access type indicated in the update service operation message.

Example implementations, in accordance with an embodiment, of the UE 12, AMF node 16, SMSF node 18 and a network node 26 (e.g., UDM node, RAN node, etc.) discussed in the preceding paragraphs will now be described with reference to FIG. 5.

The UE 12 includes a communication interface 40, processing circuitry 42, and memory 44. The communication interface 40 may be configured to communicate with the RAN 20 and/or AMF node 16 and/or other elements in the system 10 according to the techniques in the present disclosure. In some embodiments, the communication interface 40 may be formed as or may include, for example, one or more radio frequency (RF) transmitters, one or more RF receivers, and/or one or more RF transceivers, and/or may be considered a radio interface. In some embodiments, the communication interface 40 may also include a wired interface.

The processing circuitry 42 may include one or more processors 46 and memory, such as, the memory 44. In particular, in addition to a traditional processor and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) the memory 44, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 12 may further include software stored internally in, for example, memory 44, or stored in external memory (e.g., database) accessible by the UE 12 via an external connection. The software may be executable by the processing circuitry 42. The processing circuitry 42 may be configured to control any of the methods and/or processes described herein and/or to cause such methods, and/or processes to be performed, e.g., by the UE 12. The memory 44 is configured to store data, programmatic software code and/or other information described herein. In some embodiments, the software may include instructions stored in memory 44 that, when executed by the processor 46 causes the processing circuitry 42 and/or configures the UE 12 to perform the processes described herein with respect to the UE 12.

The AMF node 16 includes a communication interface 50, processing circuitry 52, and memory 54. The communication interface 50 may be configured to communicate with the SMSF node 18 and/or other elements in the system 10 according to one or more of the techniques in the present disclosure. In some embodiments, the communication interface 50 may be formed as or may include, for example, one or more radio frequency (RF) transmitters, one or more RF receivers, and/or one or more RF transceivers, and/or may be considered a radio interface. In some embodiments, the communication interface 50 may also include a wired interface.

The processing circuitry 52 may include one or more processors 56 and memory, such as, the memory 54. In particular, in addition to a traditional processor and memory, the processing circuitry 52 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 56 may be configured to access (e.g., write to and/or read from) the memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the AMF node 16 may further include software stored internally in, for example, memory 54, or stored in external memory (e.g., database) accessible by the AMF node 16 via an external connection. The software may be executable by the processing circuitry 52. The processing circuitry 52 may be configured to control any of the methods and/or processes described herein and/or to cause such methods, and/or processes to be performed, e.g., by the AMF node 16. The memory 54 is configured to store data, programmatic software code and/or other information described herein. In some embodiments, the software may include instructions stored in memory 54 that, when executed by the processor 56 and/or update requester 22, causes the processing circuitry 52 and/or configures the AMF node 16 to perform the processes described herein with respect to the AMF node 16 (e.g., processes described with reference to FIG. 6 and/or any of the other flowcharts).

The SMSF node 18 includes a communication interface 60, processing circuitry 62, and memory 64. The communication interface 60 may be configured to communicate with the AMF node 16 and/or the UDM node 14 and/or other elements in the system 10 according to one or more of the techniques in the present disclosure. In some embodiments, the communication interface 60 may be formed as or may include, for example, one or more radio frequency (RF) transmitters, one or more RF receivers, and/or one or more RF transceivers, and/or may be considered a radio interface. In some embodiments, the communication interface 60 may also include a wired interface.

The processing circuitry 62 may include one or more processors 66 and memory, such as, the memory 64. In particular, in addition to a traditional processor and memory, the processing circuitry 62 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) the memory 64, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the SMSF node 18 may further include software stored internally in, for example, memory 64, or stored in external memory (e.g., database) accessible by the SMSF node 18 via an external connection. The software may be executable by the processing circuitry 62. The processing circuitry 62 may be configured to control any of the methods and/or processes described herein and/or to cause such methods, and/or processes to be performed, e.g., by the SMSF node 18. The memory 64 is configured to store data, programmatic software code and/or other information described herein. In some embodiments, the software may include instructions stored in memory 64 that, when executed by the processor 66 and/or updater 24, causes the processing circuitry 62 and/or configures the SMSF node 18 to perform the processes described herein with respect to the SMSF node 18 (e.g., processes described with reference to FIG. 7 and/or any of the other flowcharts).

The network node 26 (e.g., UDM node 14, RAN node 20 etc.) includes a communication interface 70, processing circuitry 72, and memory 74. The communication interface 70 may be configured to communicate the elements in the system 10 according to one or more of the techniques in the present disclosure. In some embodiments, the communication interface 70 may be formed as or may include, for example, one or more radio frequency (RF) transmitters, one or more RF receivers, and/or one or more RF transceivers, and/or may be considered a radio interface. In some embodiments, the communication interface 70 may also include a wired interface.

The processing circuitry 72 may include one or more processors 76 and memory, such as, the memory 74. In particular, in addition to a traditional processor and memory, the processing circuitry 72 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 76 may be configured to access (e.g., write to and/or read from) the memory 74, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 26 may further include software stored internally in, for example, memory 74, or stored in external memory (e.g., database) accessible by the network node 26 via an external connection. The software may be executable by the processing circuitry 72. The processing circuitry 72 may be configured to control any of the methods and/or processes described herein and/or to cause such methods, and/or processes to be performed, e.g., by the network node 26. The memory 74 is configured to store data, programmatic software code and/or other information described herein. In some embodiments, the software may include instructions stored in memory 74 that, when executed by the processor 76, causes the processing circuitry 72 and/or configures the network node 26 to perform the processes described herein with respect to the network node 26 (e.g., UDM node 14, RAN node 20, etc.).

Figure 5:
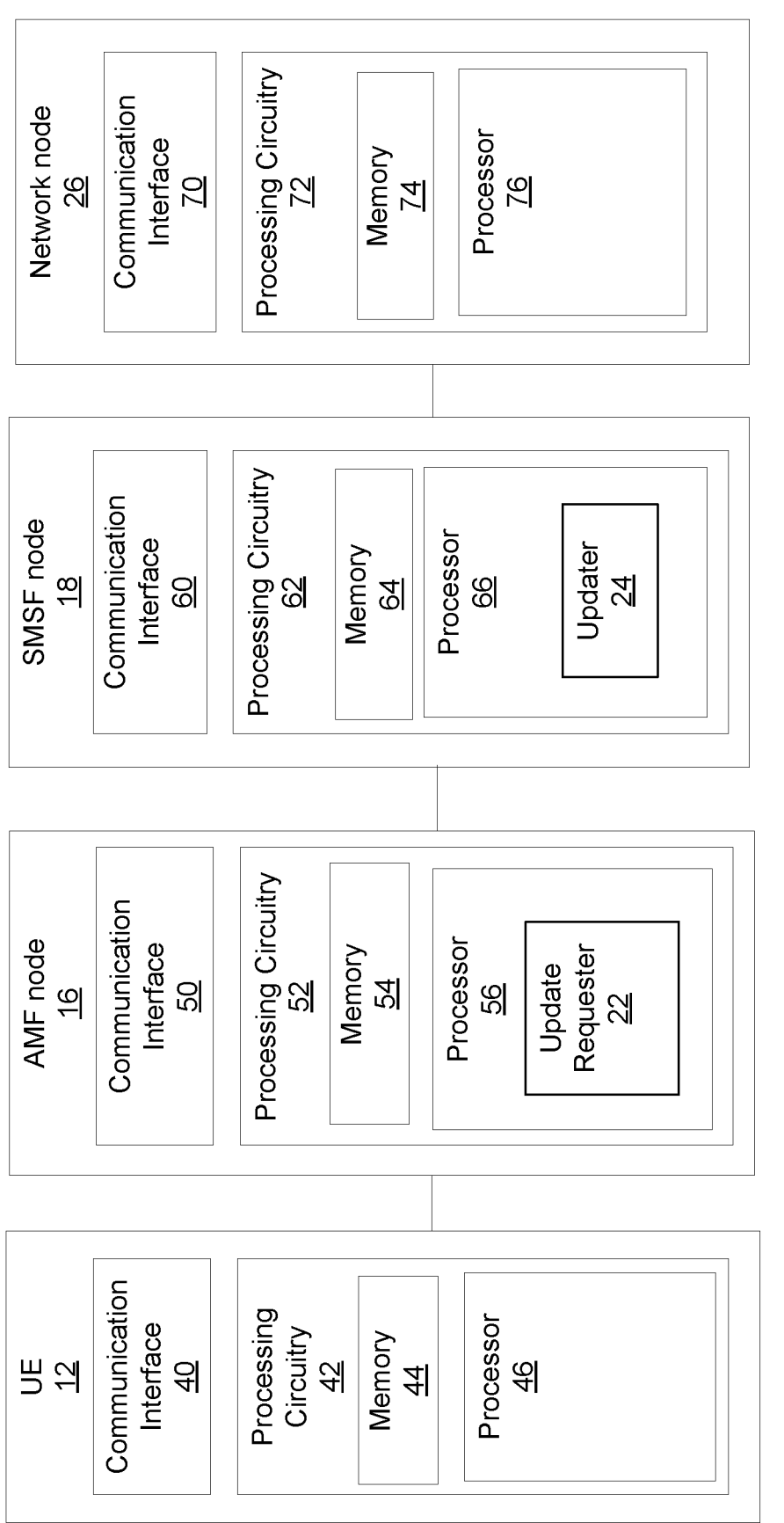
FIG. 5 illustrates yet another example system architecture and example hardware arrangements for devices in the system, according to some embodiments of the present disclosure.

In FIG. 5, the connection between the devices UE 12, AMF node 16, SMSF node 18 and network node 26 is shown without explicit reference to any intermediary devices or connections. However, it should be understood that intermediary devices and/or connections may exist between these devices, although not explicitly shown.

Although FIG. 5 shows update requester 22 and updater 24 as being within a respective processor, it is contemplated that these elements may be implemented such that a portion of the elements is stored in a corresponding memory within the processing circuitry. In other words, the elements may be implemented in hardware or in a combination of hardware and software within the processing circuitry.

Figure 6:
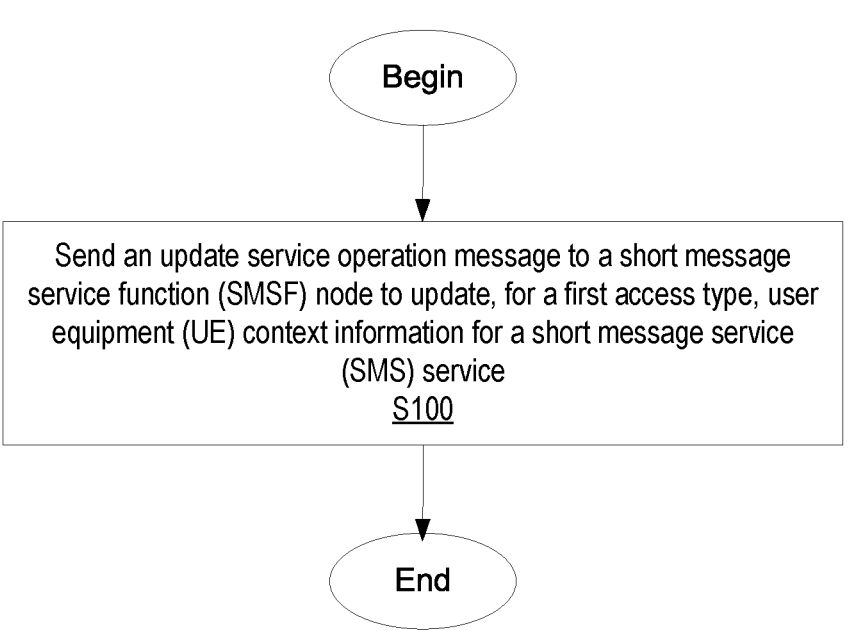
FIG. 6 is a flowchart of an exemplary process in a network node (e.g., AMF node) according to some embodiments of the present disclosure.

FIG. 6 is a flowchart of an exemplary process in a AMF node 16 according to one or more of the techniques in the present disclosure. One or more Blocks and/or functions and/or methods performed by the AMF node 16 may be performed by one or more elements of AMF node 16 such as by update requester 22 in processing circuitry 52, memory 54, processor 56, communication interface 50, etc. according to the example process/method. The example process includes sending (Block S100), such as via update requester 22, processing circuitry 52, memory 54, processor 56 and/or communication interface 50, an update service operation message to a short message service function (SMSF) node to update, for a first access type, user equipment (UE) context information for a short message service (SMS) service.

In some embodiments, sending further comprises, while a user equipment (UE) is registered in the AMF node at the first access type and a second access type for a short message service (SMS) service, sending, such as via update requester 22, processing circuitry 52, memory 54, processor 56 and/or communication interface 50, the update service operation message to the SMSF node to remove, for the first access type, the UE context information for the SMS service and/or while maintaining the UE context information for the second access type.

In some embodiments, sending the update service operation message to remove, for the first access type, the UE context information is responsive to at least one of: the UE indicating to the AMF node to discontinue use of the SMS service for the first access type; the UE being deregistered on the first access type; receiving a deregistration notification from a unified data management (UDM) node for the first access type. In some embodiments, sending further comprises, while a user equipment (UE) is registered in the AMF node at a second access type for a short message service (SMS) service, sending, such as via update requester 22, processing circuitry 52, memory 54, processor 56 and/or communication interface 50, the update service operation message to the SMSF node to add, for the first access type, the UE context information for the SMS service and/or while maintaining the UE context information for the second access type.

In some embodiments, the update service operation message includes an indication of the first access type that is to be updated. In some embodiments, the update service operation message further includes at least one of a Time Zone for the UE, the UE's routing indicator and the unified data management (UDM) group identifier for the UE that is to be updated in the UE context information for the first access type.

Figure 7:
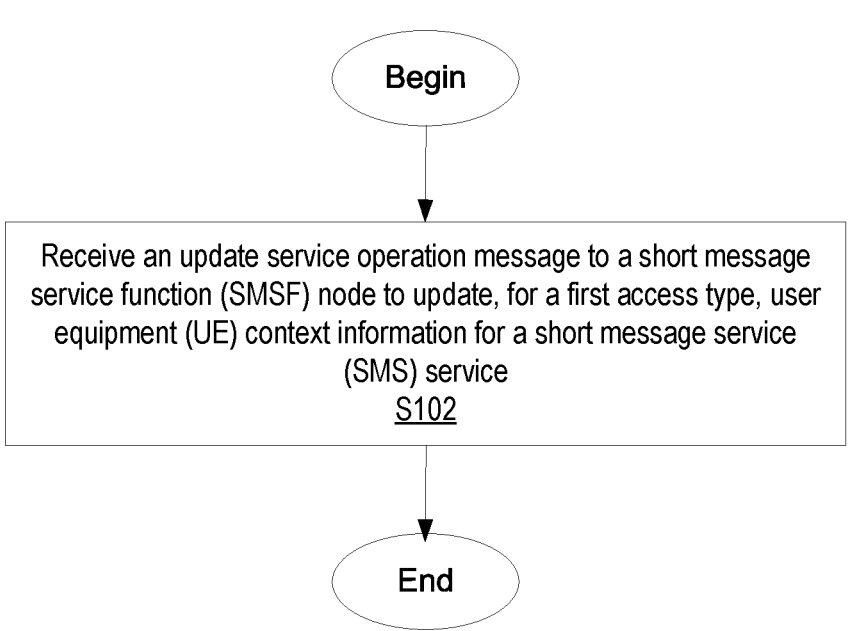
FIG. 7 is a flowchart of an exemplary process in a network node (e.g., SMSF node) according to some embodiments of the present disclosure.

FIG. 7 is a flowchart of an exemplary process in an SMSF node 18 according to one or more of the techniques in the present disclosure. One or more Blocks and/or functions and/or methods performed by the SMSF node 18 may be performed by one or more elements of SMSF node 18 such as updater 24 in processing circuitry 62, memory 64, processor 66, communication interface 60, etc. according to the example process/method. The example process includes receiving (Block S104), such as via updater 24, processing circuitry 62, memory 64, processor 66 and/or communication interface 60, an update service operation message, the update service response message requesting to update, for a first access type, user equipment (UE) context information for a short message service (SMS) service.

In some embodiments, receiving further comprises receiving, such as via updater 24, processing circuitry 62, memory 64, processor 66 and/or communication interface 60, an update service operation message, the update service operation message while a user equipment (UE) is registered in the AMF node at the first access type and a second access type for the short message service (SMS) service; and the update service operation message requesting to remove, for the first access type, the UE context information for the SMS service. In some embodiments, the method further comprises, responsive to the update service operation message request to remove, for the first access type, the UE context information for the SMS service, releasing, such as via updater 24, processing circuitry 62, memory 64, processor 66 and/or communication interface 60, an update service operation message, the UE context for the SMS service for the first access type and/or while maintaining the UE context information for the second access type.

In some embodiments, receiving further comprises, while a user equipment (UE) is registered in the AMF node at a second access type for a short message service (SMS) service, receiving the update service operation message to the SMSF node to add, for the first access type, the UE context information for the SMS service; and responsive to the update service operation message request to add, for the first access type, the UE context information for the SMS service, adding, such as via updater 24, processing circuitry 62, memory 64, processor 66 and/or communication interface 60, an update service operation message, the UE context information for the SMS service for the first access type and/or while maintaining the UE context information for the SMS service for the second access type.

In some embodiments, the update service operation message includes an indication of the first access type that is to be updated by the SMSF node 18. In some embodiments, the update service operation message further includes at least one of a Time Zone for the UE, the UE's routing indicator and the unified data management (UDM) group identifier for the UE that is to be updated by the SMSF node 18 in the UE context information for the first access type.

In some embodiments, the method further includes responsive to the received update service operation message, one of adding and removing the UE context information for the indicated first access type according to UE information included in the message.

FIG. 8 is a flowchart of an exemplary process in a AMF node 16 according to one or more of the techniques in the present disclosure. One or more Blocks and/or functions and/or methods performed by the AMF node 16 may be performed by one or more elements of AMF node 16 such as by update requester 22 in processing circuitry 52, memory 54, processor 56, communication interface 50, etc. according to the example process/method. The example process includes performing (Block S104), such as by update requester 22, processing circuitry 52, memory 54, processor 56 and/or communication interface 50, an update service operation with a short message service function, SMSF, node to add or remove a first user equipment, UE, context information associated to a first access type, the update service operation indicating to the SMSF node the first access type to add or remove.

In some embodiments, the performing the update service operation comprises sending, such as by update requester 22, processing circuitry 52, memory 54, processor 56 and/or communication interface 50, a short message service, SMS, service message to the SMSF node, the SMS service message comprising an indication of the first access type to add or remove. In some embodiments, sending the SMS service message comprises sending, such as by update requester 22, processing circuitry 52, memory 54, processor 56 and/or communication interface 50, a short message service, SMS, service activate message to add the first UE context information associated to the first access type; sending, such as by update requester 22, processing circuitry 52, memory 54, processor 56 and/or communication interface 50, a short message service, SMS, service de-activate message to remove first the UE context information associated to the first access type; and sending, such as by update requester 22, processing circuitry 52, memory 54, processor 56 and/or communication interface 50, a short message service, SMS, service update message to add or remove first the UE context information associated to the first access type.

In some embodiments, performing the update service operation to remove the first UE context information associated to the first access type comprises: while a user equipment, UE, is registered at the AMF node for a short message service, SMS, service over the first access type and over a second access type, sending, such as by update requester 22, processing circuitry 52, memory 54, processor 56 and/or communication interface 50, a SMS service message indicating the first access type to request the SMSF node to remove the first UE context information associated to the first access type and the UE, while maintaining at the SMSF node a second UE context information associated to the second access type and the UE. In some embodiments, performing the update service operation to remove, such as by update requester 22, processing circuitry 52, memory 54, processor 56 and/or communication interface 50, the first UE context information associated to the first access type is as a result of at least one of: the UE indicating to the AMF node to discontinue use of the SMS service over the first access type; the UE being deregistered on the first access type; and receiving a deregistration notification associated with the UE from a unified data management, UDM, node for the first access type.

In some embodiments, performing the update service operation to add the first UE context information associated to the first access type comprises: while a user equipment, UE, is registered at the AMF node for a short message service, SMS, service over a second access type, sending, such as by update requester 22, processing circuitry 52, memory 54, processor 56 and/or communication interface 50, a SMS service message indicating the first access type to request the SMSF node to add the first UE context information associated to the first access type and the UE, while maintaining at the SMSF node a second UE context information associated to the second access type and the UE.

In some embodiments, the update service operation indicates to the SMSF node further information to add or remove from the first UE context information associated to the first access type. In some embodiments, the further information comprises at least one of a Time Zone, a routing indicator and a unified data management, UDM, group identifier for the UE that is to be added or removed in the first UE context information associated to the first access type.

FIG. 9 is a flowchart of an exemplary process in an SMSF node 18 according to one or more of the techniques in the present disclosure. One or more Blocks and/or functions and/or methods performed by the SMSF node 18 may be performed by one or more elements of SMSF node 18 such as updater 24 in processing circuitry 62, memory 64, processor 66, communication interface 60, etc. according to the example process/method. The example process includes performing (Block S106), such as by as updater 24, processing circuitry 62, memory 64, processor 66 and/or communication interface 60, an update service operation with an access and mobility management, AMF, node to add or remove a first user equipment, UE, context information associated to a first access type, the update service operation indicating to the SMSF node the first access type to add or remove.

In some embodiments, the performing the update service operation comprises receiving, such as by as updater 24, processing circuitry 62, memory 64, processor 66 and/or communication interface 60, a short message service, SMS, service message from the AMF node, the SMS service message comprising an indication of the first access type to add or remove. In some embodiments, receiving the SMS service message comprises receiving, such as by as updater 24, processing circuitry 62, memory 64, processor 66 and/or communication interface 60, a short message service, SMS, service activate message requesting the SMFS node to add the first UE context information associated to the first access type; receiving, such as by as updater 24, processing circuitry 62, memory 64, processor 66 and/or communication interface 60, a short message service, SMS, service de-activate message requesting the SMFS node to remove first the UE context information associated to the first access type; and receiving, such as by as updater 24, processing circuitry 62, memory 64, processor 66 and/or communication interface 60, a short message service, SMS, service update message requesting the SMFS node to add or remove the first the UE context information associated to the first access type.

In some embodiments, performing the update service operation to remove the first UE context information associated to the first access type comprises: as a result of receipt of a short message service, SMS, service message indicating the first access type, releasing, such as by as updater 24, processing circuitry 62, memory 64, processor 66 and/or communication interface 60, the first UE context information associated to the first access type and the UE, while maintaining, such as by as updater 24, processing circuitry 62, memory 64, processor 66 and/or communication interface 60, at the SMSF node a second UE context information associated to the second access type and the UE.

In some embodiments, performing the update service operation to remove the first UE context information associated to the first access type is as a result of at least one of: the UE indicating to the AMF node to discontinue use of the SMS service over the first access type; the UE being deregistered on the first access type; and a deregistration notification associated with the UE from a unified data management, UDM, node for the first access type. In some embodiments, performing the update service operation to add the first UE context information associated to the first access type comprises: as a result of receipt of a short message service, SMS, service message indicating the first access type, adding, such as by as updater 24, processing circuitry 62, memory 64, processor 66 and/or communication interface 60, the first UE context information associated to the first access type and the UE, while maintaining, such as by as updater 24, processing circuitry 62, memory 64, processor 66 and/or communication interface 60, at the SMSF node a second UE context information associated to the second access type and the UE.

In some embodiments, the update service operation requests the SMSF node to add or remove further information from the first UE context information associated to the first access type. In some embodiments, the further information comprises at least one of a Time Zone, a routing indicator and a unified data management, UDM, group identifier for the UE that is to be added or removed in the first UE context information associated to the first access type.

Having generally described arrangements for an update service operation for SMS service, a more detailed description of some of the embodiments are provided as follows with reference to FIG. 8, and which may be implemented by UE 12, AMF node 16, SMSF node 18 and/or network node 26.

Some embodiments provide arrangements that may be used in at least two main use cases that are specified herein in relation to the proposed embodiments of the present disclosure.

Add an Access Type

One embodiment of the present disclosure may provide arrangements for adding a new access type for the SMS service.

For example, the UE 12 may register (e.g., send a registration request to the AMF node 16 to register to the 5GS) in N3GPP access (non-3GPP access) and then the AMF node 16 registers the UE 12 in the SMSF node 18 based on, e.g., clause 4.13.3.1 in TS 23.502. The UE 12 may register in N3GPP access via the same AMF node 16 (e.g., same AMF as the AMF that the UE used to registered via the 3GPP access). The AMF node 16 may then use an update service operation (e.g., existing activate/deactivate or separate service operation) to add the new access type, among other parameters.

Figure 10:
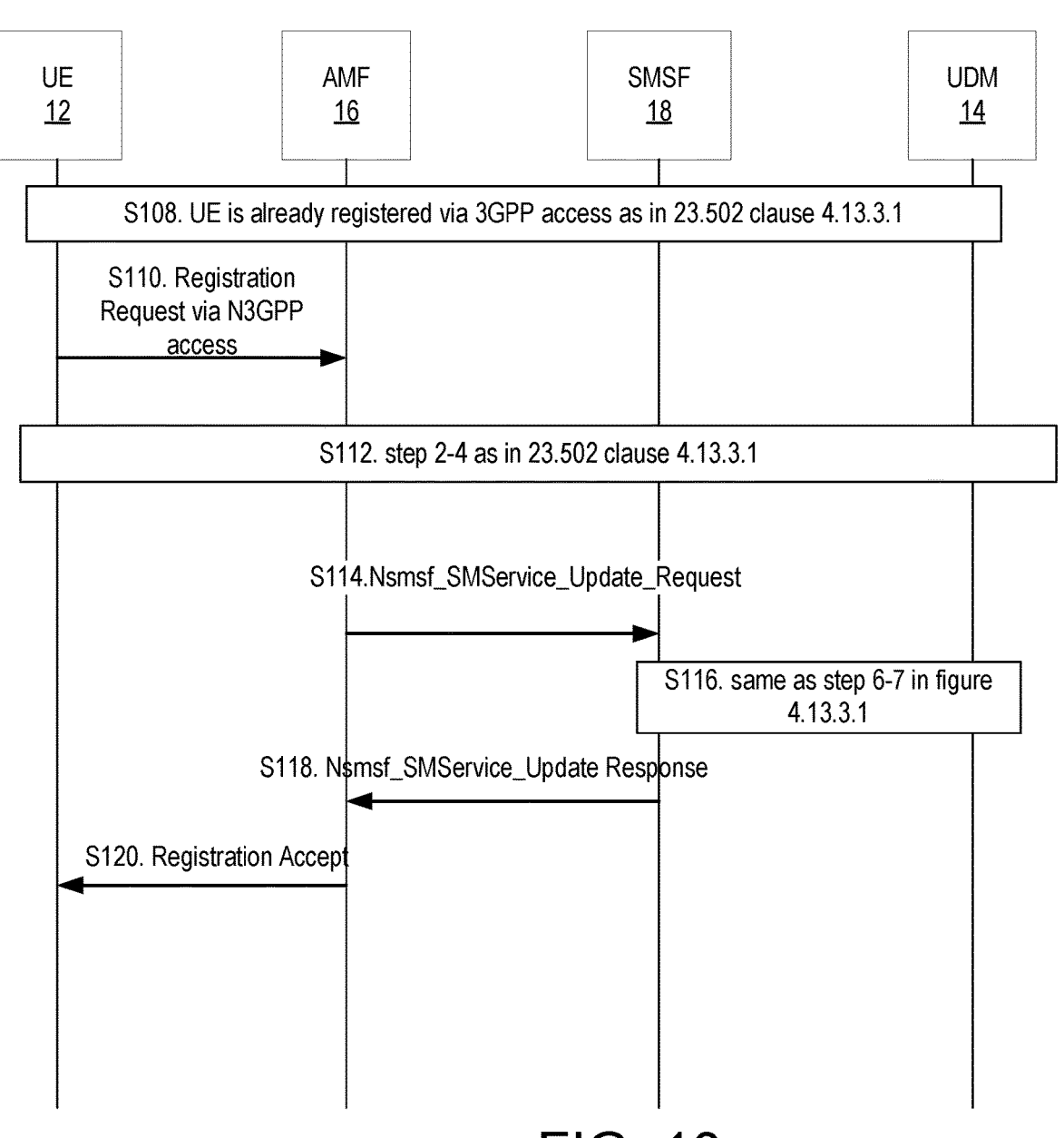
FIG. 10 illustrates an example registration procedure according to one embodiment of the present disclosure.

Referring to the flow chart in FIG. 10, example steps for adding a new access type for the SMS service may include one or more of the following (in some embodiments, it may be assumed that the UE 12 is already registered via 3GPP access as in TS 23.502 clause 4.13.3.1):

Initially, in Step S108, the UE 12 is registered in the AMF node 16 via one access type (e.g., 3GPP access) and the SMS service is activated for the UE 12.

Step S110. UE 12 registers towards the same AMF node 16 via another access type (e.g., non-3GPP access). Note: this may mean that the UE 12 selected 3GPP and non-3GPP access in the same public land mobile network (PLMN).

Step S112. Step S112 of FIG. 10 may be the same as steps 2-4 of FIG. 4.13.3.1 in TS 23.502, which is incorporated herein by reference.

Step S114. AMF node 16 selects the existing SMSF node 18 and informs the SMSF node 18 of the new access type (in some embodiments, along with other parameters), by invoking the Nsmf_SMService_Update/Activate service operation (e.g., sending a service update operation request message to the SMSF node 18 to update the indicated UE's 12 SMS service information including the access type).

Step S116. Step S114 of FIG. 10 may be the same as steps 6-7 of FIG. 4.13.3.1 in TS 23.502.

Step S118. The SMSF node 18 responds back to the AMF node 16 with a Nsmsf_SMService_Update/Activate service operation response message.

Step S120. The AMF node 16 includes the "SMS allowed" indication to the UE 12 in the Registration Accept message, as in step 9 of FIG. 4.13.3.1 in TS 23.502.

Remove an Access Type

One embodiment of the present disclosure may provide arrangements for removing a new access type for the SMS service, e.g., in particular the removing of one access type for a UE 12 that has SMS service for 2 access types.

For example, the AMF node 16 may also use an update service operation to remove one access type, such as e.g., a separate update service operation or existing activate/deactivate service operation that has been changed to allow per access type updates. In some embodiments, the AMF node 16 requests from the SMSF node 18 removal of one access type (out of two more access types) for the indicated UE 12 by invoking e.g., the Nsmf_SMService_Update/Deactivate service operation (e.g., sending a service operation request message to the SMSF node 18 to update by removing the indicated accept type (e.g., 3GPP access type or N3GPP access type) from the UE's 12 SMS service information).

Example Update Service Operation

One example definition for the service update service operation is shown below:

Nsmsf_SMService_Update service operation

Service operation name: Nsmsf_SMService_Update.

Description: update the specified UE SMS service information.

Concurrent use: None.

Inputs, Required: subscription permanent identifier (SUPI), network function (NF) ID.

Inputs, Optional: Access Type (adding or removal), Time Zone, UE's Routing Indicator or UDM Group ID for the UE.

Outputs, Required: SMS service update result.

Outputs, Optional: None.

In one example, Section 5.2.9 (SMSF Services) of 3GPP TS 23.502 may be changed to the following:

5.2.9.1 General

The following table illustrates the SMSF Services.

TABLE 5.2.9.1-1

List of SMSF Services

| Service Name | Service Operations | Operation Semantics | Example Consumer(s) |
|---|---|---|---|
| Nsmsf_SMService | Activate | Request/Response | AMF |
| | Update | Request/Response | AMF |
| | Deactivate | Request/Response | AMF |
| | UplinkSMS | Request/Response | AMF |

Similarly, 3GPP TS 23.502 may be updated to add Section 5.2.9.2.x to reflect the example update service operation provided above.

In addition to the access type input parameter, Time Zone, UE's routing indicator, or UDM group identifier is shown and may be included as part of the update operation. For example, by defining a Time Zone input parameter to the proposed update service operation, the Time Zone in the UE's 12 SMS context may be updated accordingly for the UE 12. These parameters may be used by the network, e.g., by the AMF node 16 and SMSF node 18 to create a UE context per access type for the UE 12. In other embodiments, the service operation e.g., "Nsmsf_SMSService_Update/Deactivate" may be defined in other ways and/or may include more or less than the parameters shown in the example definition above.

There is no way in the current 3GPP specifications to update the UE context from the AMF to the SMSF e.g., per access type in a currently defined service operation. Some embodiments of the present disclosure propose a service operation to update UE related information from AMF to SMSF (e.g., without the previous UE context being overridden totally in the SMSF, such as may occur using an activate service operation and/or without the entire UE context being deleted, as may occur using a deactivate service operation), such as a new separate update service operation or a modification to existing activate/deactivate service operations according to the techniques described herein.

Some embodiments may include one or more of the following:

Embodiment A1. A method implemented in an access and mobility management function (AMF) node, the method comprising:

sending an update service operation message to a short message service function (SMSF) node to update, for a first access type, user equipment (UE) context information for a short message service (SMS) service.

Embodiment A2. The method of Embodiment A1, wherein sending further comprises:

while a user equipment (UE) is registered in the AMF node at the first access type and a second access type for a short message service (SMS) service, sending the update service operation message to the SMSF node to remove, for the first access type, the UE context information for the SMS service and/or while maintaining the UE context information for the second access type.

Embodiment A3. The method of Embodiment A2, wherein sending the update service operation message to remove, for the first access type, the UE context information is responsive to at least one of:

the UE indicating to the AMF node to discontinue use of the SMS service for the first access type;

the UE being deregistered on the first access type; and receiving a deregistration notification from a unified data management (UDM) node for the first access type.

Embodiment A4. The method of Embodiment A1, wherein sending further comprises:

while a user equipment (UE) is registered in the AMF node at a second access type for a short message service (SMS) service, sending the update service operation message to the SMSF node to add, for the first access type, the UE context information for the SMS service and/or while maintaining the UE context information for the second access type.

Embodiment A5. The method of any one of Embodiments A1-A4, wherein the update service operation message includes an indication of the first access type that is to be updated.

Embodiment A6. The method of Embodiment A5, wherein the update service operation message further includes at least one of a Time Zone for the UE, the UE's routing indicator and the unified data management (UDM) group identifier for the UE that is to be updated in the UE context information for the first access type.

Embodiment B1. An access and mobility management function (AMF) node comprising processing circuitry and/or a communication interface, the AMF node and/or the processing circuitry and/or the communication interface configured to cause the AMF node to:

send an update service operation message to a short message service function (SMSF) node to update, for a first access type, user equipment (UE) context information for a short message service (SMS) service.

Embodiment B2. The AMF node of Embodiment B1, wherein the AMF node and/or the processing circuitry and/or the communication interface is configured to cause the AMF node to send the update service operation by being configured to cause the AMF node to:

while a user equipment (UE) is registered in the AMF node at a first access type and a second access type for a short message service (SMS) service, send the update service operation message to the SMSF node to remove, for the first access type, the UE context information for the SMS service and/or while maintaining the UE context information for the second access type.

Embodiment B3. The AMF node of Embodiment B2, wherein sending the update service operation message to remove, for the first access type, the UE context information is responsive to at least one of:

the UE indicating to the AMF node to discontinue use of the SMS service for the first access type;

the UE being deregistered on the first access type; and receiving a deregistration notification from a unified data management (UDM) node for the first access type.

Embodiment B4. The AMF node of Embodiment B1, wherein the AMF node and/or the processing circuitry and/or the communication interface is configured to cause the AMF node to send the update service operation message by being configured to cause the AMF node to:

while a user equipment (UE) is registered in the AMF node at a second access type for a short message service (SMS) service, send the update service operation message to the SMSF node to add, for the first access type, the UE context information for the SMS service and/or while maintaining the UE context information for the second access type.

Embodiment B5. The AMF node of any one of Embodiments B1-B4, wherein the update service operation message includes an indication of the first access type that is to be updated.

Embodiment B6. The AMF node of Embodiment B5, wherein the update service operation message further includes at least one of a Time Zone for the UE, the UE's routing indicator and the unified data management (UDM) group identifier for the UE that is to be updated in the UE context information for the first access type.

Embodiment C1. A method implemented in a short message service function (SMSF) node, the method comprising:

receiving an update service operation message, the update service response message requesting to update, for a first access type, user equipment (UE) context information for a short message service (SMS) service.

Embodiment C2. The method of Embodiment C1, wherein receiving further comprises:

receiving the update service operation message while a user equipment (UE) is registered in the AMF node at the first access type and a second access type for the short message service (SMS) service; and the update service operation message requesting to remove, for the first access type, the UE context information for the SMS service.

Embodiment C3. The method of Embodiment C2, further comprising:

responsive to the update service operation message request to remove, for the first access type, the UE context information for the SMS service, releasing the UE context for the SMS service for the first access type and/or while maintaining the UE context information for the second access type.

Embodiment C4. The method of Embodiment C1, wherein receiving further comprises:

while a user equipment (UE) is registered in the AMF node at a second access type for a short message service (SMS) service, receiving the update service operation message to the SMSF node to add, for the first access type, the UE context information for the SMS service; and responsive to the update service operation message request to add, for the first access type, the UE context information for the SMS service, adding the UE context information for the SMS service for the first access type and/or while maintaining the UE context information for the SMS service for the second access type.

Embodiment C5. The method of any one of Embodiments C1-C4, wherein the update service operation message includes an indication of the first access type that is to be updated.

Embodiment C6. The method of Embodiment C5, wherein the update service operation message further includes at least one of a Time Zone for the UE, the UE's routing indicator and the unified data management (UDM) group identifier for the UE that is to be updated in the UE context information for the first access type.

Embodiment C7. The method of any one of Embodiments C1-C6, further comprising:

responsive to the received update service operation message, one of adding and removing the UE context information for the indicated first access type according to UE information included in the message.

Embodiment D1. A short message service function (SMSF) node comprising processing circuitry and/or a communication interface, the SMSF node and/or the processing circuitry and/or the communication interface configured to cause the SMSF node to:

receive an update service operation message, the update service response message requesting to update, for a first access type, user equipment (UE) context information for a short message service (SMS) service.

Embodiment D2. The SMSF node of Embodiment D1, wherein the SMSF node and/or the processing circuitry and/or the communication interface is configured to cause the SMSF node to receive by being configured to cause the SMSF node to:

receive the update service operation message while a user equipment (UE) is registered in the AMF node at the first access type and a second access type for the short message service (SMS) service; and the update service operation message requests to remove, for the first access type, the UE context information for the SMS service.

Embodiment D3. The SMSF node of Embodiment D2, wherein the SMSF node and/or the processing circuitry and/or the communication interface is configured to cause the SMSF node to receive by being configured to cause the SMSF node to:

responsive to the update service operation message request to remove, for the first access type, the UE context information for the SMS service, release the UE context for the SMS service for the first access type and/or while maintaining the UE context information for the second access type.

Embodiment D4. The SMSF node of Embodiment D1, wherein the SMSF node and/or the processing circuitry and/or the communication interface is configured to cause the SMSF node to receive by being configured to cause the SMSF node to:

while a user equipment (UE) is registered in the AMF node at a second access type for a short message service (SMS) service, receiving the update service operation message to the SMSF node to add, for the first access type, the UE context information for the SMS service; and responsive to the update service operation message request to add, for the first access type, the UE context information for the SMS service, adding the UE context information for the SMS service for the first access type and/or while maintaining the UE context information for the SMS service for the second access type.

Embodiment D5. The SMSF node of any one of Embodiments D1-D4, wherein the update service operation message includes an indication of the first access type that is to be updated.

Embodiment D6. The SMSF node of Embodiment D5, wherein the update service operation message further includes at least one of a Time Zone for the UE, the UE's routing indicator and the unified data management (UDM) group identifier for the UE that is to be updated in the UE context information for the first access type.

Embodiment D7. The SMSF node of any one of Embodiments D1-D6, wherein the SMSF node and/or the processing circuitry and/or the communication interface is configured to cause the SMSF node to:

responsive to the received update service operation message, one of add and remove the UE context information for the indicated first access type according to UE information included in the message.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method implemented in an access and mobility management, AMF, node, the method comprising:
    performing a first update service operation with a short message service function, SMSF, node to add a first user equipment, UE, context information associated to a first access type, the first update service operation indicating to the SMSF node the first access type to add when the UE registers in the first access type;
    performing a second update service operation with a short message service function, SMSF, node to add a second UE context information associated to a second access type, the second update service operation indicating to the SMSF node the second access type to add when the UE registers in the second access type; and
    when the UE deregisters from the first access type, performing a third update service operation to delete the first UE context information associated to the first access type, the third update service operation indicates to the SMSF node the first access type to remove while maintaining the second context information associated to the second access type.

2. The method of claim 1, wherein the performing the first update service operation comprises sending a short message service, SMS, service message to the SMSF node, the SMS service message comprising an indication of the first access type to add.

3. The method of claim 1, wherein one or more of:
    the performing of the first update service operation comprises sending a short message service, SMS, service activate message to add the first UE context information associated to the first access type;
    the performing of the second update service operation comprises sending a short message service, SMS, service activate message to add the second UE context information associated to the second access type; and
    the performing of the third update service operation comprises sending a short message service, SMS, service update message to remove the first UE context information associated to the first access type.

4. The method of claim 1, wherein the first update service operation indicates to the SMSF node further information to add to the first UE context information associated to the first access type.

5. The method of claim 4, wherein the further information comprises at least one of a Time Zone, a routing indicator and a unified data management, UDM, group identifier for the UE that is to be added in the first UE context information associated to the first access type.

6. A method implemented in a short message service function, SMSF, node, the method comprising:

performing a service operation with an access and mobility management, AMF, node to add or remove a first user equipment, UE, context information associated to a first access type, the service operation indicating to the SMSF node the first access type to add or remove; and add or delete the first user equipment, UE context information associated to the first access type without deleting an existing second UE context information associated with a second access type.

7. The method of claim 6, wherein the performing the service operation comprises receiving a short message service, SMS, service message from the AMF node, the SMS service message comprising an indication of the first access type to add or remove.

8. The method of claim 6, wherein performing the update service operation comprises:

receiving a short message service, SMS, service activate message to add the first UE context information associated to the first access type; or receiving a short message service, SMS, service deactivate message to remove the first UE context information associated to the first access type; or receiving a short message service, SMS, service update message to add or remove the first UE context information associated to the first access type.

9. The method of claim 6, wherein the service operation requests the SMSF node to add further information from the first UE context information associated to the first access type.

10. The method of claim 9, wherein the further information comprises at least one of a Time Zone, a routing indicator and a unified data management, UDM, group identifier for the UE that is to be added in the first UE context information associated to the first access type.

11. A system comprising:

an access and mobility management, AMF, node configured to perform a service operation with a short message service function, SMSF, node to:

add a first user equipment, UE, context information associated to a first access type, the service operation indicating to the SMSF node the first access type to add when the UE registers in the first access type; or delete the first user equipment, UE, context information associated to the first access type, the service operation indicating to the SMSF node the first access type to remove when the UE deregisters from the first access type; and a short message service function, SMSF, node configured to:

perform the service operation with the access and mobility management, AMF, node to add or remove the first user equipment, UE, context information associated to the first access type, the service operation indicating to the SMSF node the first access type to add or remove; and add or delete the first user equipment, UE, context information associated to the first access type without deleting an existing second UE context information associated with a second access type.

12. The system of claim 11 wherein the AMF node and the SMSF node performing the service operation further comprises the AMF node being configured to:

send a short message service, SMS, service activate message to add the first UE context information associated to the first access type; or send a short message service, SMS, service deactivate message to remove the first UE context information associated to the first access type; or send a short message service, SMS, service update message to add or remove the first UE context information associated to the first access type, and the SMSF node being configured to:

receive the short message service, SMS, service activate message to add the first UE context information associated to the first access type; or receive the short message service, SMS, service deactivate message to remove the first UE context information associated to the first access type; or receive a short message service, SMS, service update message to add or remove the first UE context information associated to the first access type.

* * * * *